(12) United States Patent
Miyasaka et al.

(10) Patent No.: US 6,515,250 B2
(45) Date of Patent: Feb. 4, 2003

(54) ELECTRIC JOINING METHOD AND APPARATUS AND A JOINED UNIT OF MEMBERS

(75) Inventors: Yoshito Miyasaka, Nagano-ken (JP); Masao Tokita, Tokyo (JP); Hitoshi Karasawa, Nagano-ken (JP); Fumitake Nishiyama, Nagano-ken (JP)

(73) Assignees: Sumitomo Coal Mining Co., Ltd., Tokyo (JP); Suwanetsu Kogyo Co., Ltd., Nagano-Ken (JP)

( * ) Notice: Subject to any disclaimer, the term of this patent is extended or adjusted under 35 U.S.C. 154(b) by 0 days.

(21) Appl. No.: 09/871,826

(22) Filed: Jun. 4, 2001

(65) Prior Publication Data

US 2002/0011468 A1 Jan. 31, 2002

(30) Foreign Application Priority Data

Jun. 7, 2000 (JP) .................................. 2000-170000
Sep. 19, 2000 (JP) .................................. 2000-283127

(51) Int. Cl.$^7$ ............................................... B23K 11/00
(52) U.S. Cl. .................. 219/78.02; 219/78.13; 219/86.1; 219/117.1; 228/193
(58) Field of Search .................... 219/78.01, 78.02, 219/78.13, 86.1, 91.2, 117.1; 228/193, 194, 195

(56) References Cited

U.S. PATENT DOCUMENTS

| | | | |
|---|---|---|---|
| 2,276,354 A | | 3/1942 | Trainer |
| 3,591,757 A | * | 7/1971 | Rudd .......................... 219/67 |
| 3,598,953 A | * | 8/1971 | Campbell ................. 219/78.02 |
| 3,818,173 A | | 6/1974 | Zinsser et al. |
| 3,987,272 A | * | 10/1976 | Stevens ....................... 219/73 |
| 4,366,361 A | | 12/1982 | Allen |
| 5,031,483 A | | 7/1991 | Weaver |
| 5,852,622 A | * | 12/1998 | Meissner et al. ............. 372/39 |

FOREIGN PATENT DOCUMENTS

| | | |
|---|---|---|
| EP | 1162022 A1 * | 12/2001 |
| FR | 1.335.300 | 12/1963 |
| JP | 6-142942 | 5/1994 |
| JP | 11-123567 | 5/1999 |
| JP | 11-158514 | 6/1999 |
| JP | 11-342479 | 12/1999 |

OTHER PUBLICATIONS

US 2002/0011468 A1 Miyasaka et al. (Jan. 31, 2002).*
Resistance Welding Manual (RWMA) 4$^{th}$ Ed. 1989.*

* cited by examiner

Primary Examiner—M. Alexandra Elve
Assistant Examiner—Kiley Stoner
(74) Attorney, Agent, or Firm—Sughrue Mion, PLLC

(57) ABSTRACT

Disclosed is a novel electric joining method and apparatus that can overcome the defects associated with the prior art while taking advantage of the technology for the pulse excited sintering process such as spark plasma sintering process or the hot-press joining process. According to the present invention, an electric joining apparatus for joining a plurality of members to be joined at the joining surfaces thereof, comprises: a pair of current-currying electrodes 13, 16 capable of contacting with the members so as to apply electricity to the members; a power supply 17 connected to the pair of energizing electrodes for supplying the energizing electrodes with at least either one of a DC current or a pulsated current; and a pressurizing unit 14 for compressing each of the pair of electrodes against the joining surfaces, wherein the pair of members are sandwiched between the energizing electrodes and applied with at least either one of the DC current or the pulsated current from the power supply under a desired pressure, thus to be joined, without using a die made of graphite.

15 Claims, 5 Drawing Sheets

[A]

[B]

[A]

[B]

[C]

[D]

ELECTRIC JOINING METHOD AND APPARATUS AND A JOINED UNIT OF MEMBERS

BACKGROUND OF THE INVENTION

The present invention relates to a joining and bonding method and an apparatus for joining two members by using a DC current and/or a pulsated current and also to a unit of members joined by the same method, and in particular, to a joining method and an apparatus and also a unit of members joined by the same method, in which a plurality of members to be joined are placed in such a way that surfaces to be joined abut one another and a pulsated current and/or a DC current, in other words, at least either one of the pulsated current or the DC current is applied thereto so that the surfaces to be joined of these members are first joined temporarily, by using a technology such as pulse-excited sintering, which includes spark plasma sintering process (SPS), or a technology of hot-press joining, and thereafter heat-treating said temporarily joined to provide a permanent joint.

Various conventional methods have been used practically for joining a plurality of members desired. There are some well known methods including; (1) welding, in which areas to be joined are heated with a burner, an arc discharge or the like, and a weld-assisting material (i.e. a welding rod) having the same or similar material properties to the members to be joined is melted to be deposited on the members, thereby accomplishing joining; (2) brazing, which unlike welding uses a brazing filler metal (an alloy of Cu, Ag or the like, or an amorphous metal) consisting of a material different from members to be joined, which is melted between the joining surfaces of the members in an inactive atmosphere such as a vacuum atmosphere, nitrogen or argon atmosphere or the like, whereby those members are joined by the medium of said brazing filler metal; and (3) spot welding, in which relatively thin metal sheets are sandwiched between a pair of electrodes and electricity is applied therethrough, to cause welding.

Although the welding operation as described above in (1) includes a process for injecting an inactive gas such as nitrogen or argon to a heated portion to prevent it from being oxidized, since in this method a welding rod is used as the weld-assisting material to be deposited on the member (i.e. to form a padding) along an outer periphery of the joining surfaces, thereby allowing a plurality of members to be joined, such welding is not suitable for use when it is desired to join the entire surfaces of the members. In addition, welding has some defects including, (a) a weld-assisting member must be used; (b) a certain volume of a joining portion of a member must be cut off in advance to enable a welding rod melt to be deposited; (c) a welded portion has to be post-treated or processed, because it is impossible to deposit the melted substance from the welding rod precisely to a desired portion; (d) training is required to learn how to control a heating or welding temperature so that the metal composition of a member to be joined does not change; (e) training is also required to control a cooling temperature and rate so as not to cause a weld crack in the welded portion; (f) a resultant thermal deformation in the areas other than the joined portion and an increase in volume of the joined portion would occur inevitably; (g) the joining of members made of different materials is difficult; and (h) the joining is not applicable to a specific metal such as SUS, due to a change in the properties possibly caused by the welding.

Although brazing as described in (2) is advantageous in that it uses an intervening brazing filler metal placed over the entire joining surfaces, and joining may be accomplished at a temperature lower than that for the above described welding, it still involves some defects such as (i) a brazing filler metal must be used; (j) a joining strength obtained is no greater than the strength of the brazing filler metal; (k) there is an overflow of brazing filler metal upon brazing and thus finish processing must be carried out on the joined portion; (l) it is impossible to join the members in the desired areas precisely due to the overflow of brazing filler metal; (m) a joint uniform in appearance is difficult to attain; (n) strength of the joint will not be uniform especially in the outer periphery, from which the brazing filler metal is likely to flow out; and (o) joining of some metals such as stainless steel (SUS) is not feasible.

Further, although the spot welding described above in (3) can generates thermal energy between the pair of electrodes in a short time and allows narrow areas to be joined in a short time, it still has defects such that (p) only a member of a thin plate-like material can be joined; (q) post-welding distortion is great; (r) an extremely small area can be welded due to the occurrence of partial welding; and (s) post-welding deformation is considerable due to the occurrence of partial welding.

Still further, the above mentioned joining methods are applicable only to the joining process between metal members, and are not suitable for joining a metal member and a non-metal member, or non-metal members.

On the other hand, there has been another joining method suggested that takes advantage of the principle of hot-press joining using a DC current applied to the members to be joined under a predetermined pressure thus accomplishing joining; and there is known a spark plasma sintering process (SPS) which uses a DC pulsated current applied to members to thereby accomplish joining, but a joining method employing SPS technology is disadvantageous in that members to be joined are required to be placed within a die made of graphite and to be joined within said die, which makes the process too complicated. Further there are many restrictions on the shape of the members that can be joined, and, in addition, a sufficiently strong joint can not be obtained. There is known another joining method taking advantage of the principle of the spark plasma sintering process as disclosed in Japanese Patent Application Laid-open Publication No. Hei 11-158514. However, this method also suffers from some problems in that it is applicable only to members having rough surfaces, which entails pre-roughening surfaces for joining, which restrict its use, making it inapplicable, for example, to mirror-surfaces, and the like, and making it difficult to attain a sufficiently strong joint. Still further, even if the conventional hot-press joining process is applied to the joining of bulk members without any modifications, it is difficult to attain a sufficiently strong joint.

SUMMARY OF THE INVENTION

An object of the present invention is to provide a novel electric joining method and apparatus which can overcome the above-mentioned defects associated with the prior art while taking advantage of the technology of the pulse excited sintering process such as a spark plasma sintering process, and also to provide a unit of members joined by the same method and apparatus.

Another object of the present invention is to provide an electric joining method and apparatus which allows a rapid and rigid joining to be accomplished in joining areas by applying at least either one of a DC current or a pulsated current to a plurality of members to be joined to one another, and also to provide a unit of members joined by the same method and apparatus.

Still another object of the present invention is to provide an electric joining method and apparatus which allows an easy and rigid joining to be performed even between the members each made of different materials, and also to provide a unit of members joined by the same method and apparatus.

Still another object of the present invention is to provide an electric joining method and apparatus which makes possible not only joining of metal members but also joining between a metal member and a non-metal member or between non-metal members, and also to provide a unit of members joined by the same method and apparatus.

Still another object of the present invention is to provide an electric joining method and apparatus which allows the joining process to be applied relatively easily and reliably even to the joining between joining surfaces having the shapes different from each other, and also to provide a unit of members joined by the same method and apparatus.

Still another object of the present invention is to provide an electric joining method and apparatus which allows joining to be accomplished with minimal deformation after joining, and also to provide a unit of members joined by the same method and apparatus.

An electric joining method according to the present invention, comprises the steps of; placing the joining surfaces of a plurality of members to be joined so as to butt against one another, without using a die made of graphite; applying a pulsated current or a combination of DC current and a pulsated current to said members while applying a desired level of pressure to them so as to joint them temporarily; and performing a mutual solid-phase diffusion heat treatment for said temporarily joined members under a desired temperature condition.

In said electric joining method, said joining surfaces may be mirror-surfaces or rough surfaces. Further, said plurality of members may be made of substantially the same material or different materials. Still further, in said electric joining method, three or more pieces of said members to be joined may be disposed in series, so that they may be joined at a plurality of pairs of joining surfaces. Yet further, in said electric joining method, said pressure applied to said members may be not more than 50 Mega-pascal (MPa), said heat treatment may be conducted under inactive atmosphere, and said heat treatment may be conducted with the temperature controlled so as to equal to or lower than the temperature of 85% of the lowest melting point of the members to be joined. Besides a locating pin may be used in order to improve a locating accuracy of the joining surfaces.

Another invention disclosed in the present application provides an electric joining apparatus for joining a plurality of members to be joined to one another at respective joining surfaces thereof, said apparatus comprising: an electric joining device including a pair of energizing electrodes capable of contacting with said members so as to apply electricity thereto, a power supply connected to said pair of current-supply electrodes for supplying said energizing electrodes with a pulsated current or a combination of a DC current and a pulsated current, and a pressurizing unit for compressing each of said pair of electrodes against said joining surfaces, wherein said pair of members are sandwiched between said energizing electrodes and applied with at least either one of the DC current or the pulsated current from said power supply under a desired pressure, thus to be joined, without using a die made of graphite; and a heat treatment device for performing a mutual solid-phase diffusion heat treatment for the temporarily joined members under a desired atmosphere, and may still further comprises an inactive gas supplying source coupled to said heat treatment equipment for supplying inactive gas into said heat treatment equipment.

Still another invention disclosed in the present application provides a unit of joined members formed by joining a plurality of members using an electric joining method, wherein a heat treatment is applied to said plurality of members having been temporarily joined by applying electricity to said members.

Said unit of joined members may be composed of a plurality of members having their joining surfaces processed to be mirror-surfaces.

DETAILED DESCRIPTION OF THE PREFERRED EMBODIMENTS

Embodiments of the present invention will now be described with reference to the attached drawings.

Figure 1:
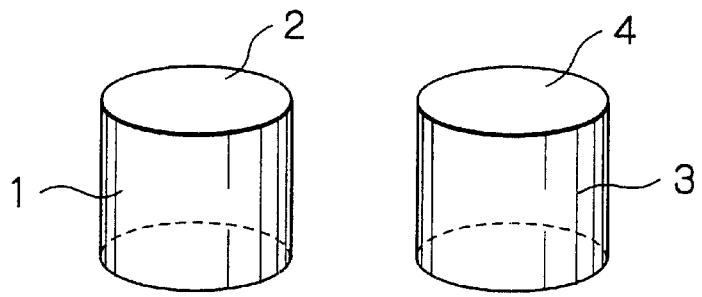
FIG. 1 is a perspective view of two members to be joined by an electric joining method according to the present invention.

First of all, there are prepared, in this embodiment two members 1 and 3 to be joined (hereinafter referred to as a member for simplicity), as shown in FIG. 1. These two members may be made of same material or of different materials. The faces which are to be joined of respective members 1 and 3, i.e. joining surfaces 2 and 4 are preferably flat, but can be, for example, curved surfaces having the same curvature, so long as no gap is created between the surfaces. These joining surfaces 2 and 4 may be rough (with surface-roughness in the order of ▽ grade as defined in JIS), but mirror-surfaces are more preferable because the joining strength for two members will be greater, and deformation resulting from such joining will be less when applied to mirror-surfaces.

Then, the members 1 and 3 are placed one on the other such that those joining surfaces 2 and 4 are butted against each other, and the members 1 and 3 are positioned between a pair of energizing electrodes of an electric joining apparatus 10. The electric joining apparatus 10, in this embodiment, comprises an electric joining section 11 and a heat treatment section 21. The electric joining section 11 comprises; a lower energizing electrode 13 secured on a base 12 via an insulating member by a know manner so as to be electrically insulated from said base 12; a fluid-pressure cylinder 14 arranged above the base 12 and secured in a known manner with respect to the base 12; and an upper energizing electrode 16 secured to the end (the lower end portion in the illustrated drawing) of a piston rod 15 of the fluid-pressure cylinder 14 via an insulating member in a know manner so as to be electrically insulated from the piston rod 15. Preferably, the electrodes 13 and 16 are made of graphite.

Said fluid-pressure cylinder 14 functions as a pressurizing device for compressing members to be joined. In order to fulfill the function for the pressurizing device, the upper energizing electrode may be moved up and down by way of an electric motor in conjunction with a screw mechanism as a substitute for the fluid-pressure cylinder 14. The upper and lower energizing electrodes are electrically connected to a power supply 17.

The power supply is adapted to supply a DC pulsated current. The power supply 17 includes an internal switch mechanism (not shown) for connecting and disconnecting the electric circuit between the power supply and the energizing electrodes. The power supply will generally be such as to afford a voltage equal to or lower than 100V and a current as high as, for example, 2000 to 5000 A. Although in the above embodiment, the lower electrode is fixedly secured, while the upper electrode is allowed to move, those electrodes may be arranged in reverse orientation, or both may be adapted to move. Preferably, the heat treatment section 21 may be a vacuum heat treatment furnace having a known configuration. Example of such a vacuum heat treatment furnace may be the furnace having Model No. VTTC-324T or NVFC-180PT purchasable from Ishikawajima-Harima Heavy Industries Co. Ltd.(IHI). Alternatively, the electric joining section 11 and the heat treatment section 21 may be integrated to have a structure allowing for a movement, or may be located separately.

When the members 1 and 3 are to be joined by said apparatus, first the members 1 and 3 are placed between the electrodes 12 and 16 with their joining surfaces 2 and 4 butted against each other, and then the fluid-pressure cylinder 14 is activated to compress the energizing electrode 16 in the direction toward the members 1 and 3 with the piston rod 15. Thereby, the pair of electrodes 12 and 16 sandwiched between the base 12 and the piston rod 15 is forced to compress against the members, so that the pair of members 1 and 3 is pushed in the direction toward the respective joining surfaces. This compressive force is controlled appropriately depending on the material of the member but may be equal to or less than 50 Mega-pascal. When the DC pulsated current of desired value from the power supply 17 is applied via the energizing electrodes 12 and 16 to the members 1 and 3 while holding them under the compressive force, the both members are joined to each other at the joining surfaces 2 and 4.

Although the detailed mechanism for this joining process is not necessarily apparent, it is considered that the joining takes place by the plasmas generated between the joining surfaces, the thermal diffusion effect by the Joule heat, the electromagnetic field diffusion effect by electric field and the like. On the other hand, even when only the DC current of a desired value is applied to the members 1 and 3, or a DC current and a pulsated current are concurrently applied to the members 1 and 3, the both members 1 and 3 may be joined to each other at the joining surfaces 2 and 4. The joining between both members in this condition is not complete from the viewpoint of joining strength. Consequently, this joining state is referred to as temporary joining, and the members temporarily joined are referred to collectively as a temporarily joined unit.

The temporarily joined unit consisting of the temporarily joined members 1 and 3 is heat-treated in the heat treatment furnace 22 of the heat treatment section 21. The inside of the furnace 22 constituting the heat treatment section 21 may be controlled to house an inactive atmosphere by means of an atmosphere control system 23 having a known structure and function. The temperature and time required to carry out this heat treatment depends on the material and size of the members. Through this heat treatment, joining between the joining surfaces having been temporarily joined becomes complete, thus becoming a completely joined unit, with a joint strength equivalent to the strength of the material of the members. As described above, the DC current, the pulsated current or the combination of the DC current and the pulsated current are available for the current to be used with the joining method and apparatus according to the present invention, and in the case where the pulsated current or the combination of the DC current and the pulsated current are used, the above method and apparatus could be referred to as a pulse excited joining method and apparatus, because there is necessarily applied a pulsated current.

EXAMPLE 1

Two round bars 1a and 3a made of SUS304 (stainless steel), each having a circular shape in cross-sectional view with a diameter of 20 mm and a length of 90 mm, as shown in 3[A], were prepared and after each of their joining surfaces 2a and 4a are processed to have a mirror-surface, they are set in the electric joining apparatus 10 as described above. Then, a DC pulsated current with a voltage within the range of 3 to 5V, for example 3.2V in this Example 1, and a current within the range of 1000 to 2000 A, for example 1850 A in this Example 1, was applied to those round bars from the power supply via the energizing electrodes for a period within the range of 10 to 30 minutes, for example 12 minutes in this Example 1, to join them temporarily. Then, the temporarily joined round bars were subjected to a mutual diffusion heat treatment in the inactive atmosphere at a temperature within the range of 1000 to 1100° C., for example 1080° C., for a period within the range of 30 to 90 minutes, for example 60 minutes in this Example 1. The unit of joined round bars, after the heat treatment had been completed, was ground so that the central portion thereof might have the average diameter of 15.05 mm, and was subjected to the tensile strength test with a gauge length of 40 mm. The result of the tensile strength test shows the resultant length of 52.0 mm, the elongation of 30%, and the tensile strength of 551 N/mm$^2$. These values for the tensile strength are comparatively almost equivalent to those obtained from a single piece of member of the same material and size.

EXAMPLE 2

Two round bars 1b and 3b made of SKD61 (alloy tool steels), each having a circular shape in cross-sectional view with a diameter of 20 mm and a length of 90 mm, as shown in 3[B], were prepared and after each of their joining surfaces 2b and 4b was processed to have a mirror-surface, they were set in the pulse excited joining apparatus 10 as described above. Then, a DC pulsated current with a voltage within the range of 3 to 5V, for example 3.6V in this Example 2, and a current within the range of 1000 to 2000 A, for example 1680 A in this Example 2, was applied to those round bars from the power supply via the energizing electrodes for a period within the range of 10 to 30 minutes, for example 15 minutes in this Example 2, to join them temporarily. Then, the temporarily joined round bars were subjected to the mutual diffusion heat treatment in the inactive atmosphere at a temperature within the range of 1000 to 1100° C., for example 1025° C., for a period within the range of 30 to 90 minutes, for example 60 minutes in this Example 2, and thereafter were annealed completely. The unit of joined round bars, after the heat treatment had been completed, was ground so that the central portion thereof might have the average diameter of 15.05 mm, and was subjected to the tensile strength test with a gauge length of 40 mm. The result of the tensile strength test shows the resultant length of 46.7 mm, the elongation of 16.8%, and the tensile strength of 695 N/mm². These values for the tensile strength are comparatively almost equivalent to those obtained from a single piece of member of the same material and size.

EXAMPLE 3

As similar to the example 2, two round bars 1b and 3b made of SKD61 (alloy tool steels), each having a circular shape in cross-sectional view with a diameter of 20 mm and a length of 90 mm, as shown in 3[B], were prepared and after each of their joining surfaces 2b and 4b was processed to have a mirror-surface, they were set in the electric joining apparatus 10 as described above. Then, a DC current with a voltage within the range of 5 to 10V, for example 5.4V in this Example 3, and a current within the range of 800 to 2000 A, for example 1450 A in this Example 3, was applied to those round bars from the power supply via the energizing electrodes for a period within the range of 60 to 120 minutes, for example 60 minutes in this Example 3, to join them temporarily. Then, the temporarily joined round bars were subjected to the mutual diffusion heat treatment in the inactive atmosphere at a temperature within the range of 1000 to 1100° C., for example 1025° C. for a period within the range of 30 to 90 minutes, for example 60 minutes in this Example 3, and thereafter were annealed completely. The unit of joined round bars, after the heat treatment had been completed, was ground so that the central portion thereof might have the average diameter of 15.05 mm, and was subjected to the tensile strength with a gauge length of 40 mm. The result of the tensile strength test shows the resultant length of 44.6 mm, the elongation of 11.5%, and the tensile strength of 685 N/mm². These values for the tensile strength are comparatively almost equivalent to those obtained from a single piece of member of the same material and size.

EXAMPLE 4

As similar to the example 2, two round bars 1b and 3b made of SKD61 (alloy tool steels), each having a circular shape in cross-sectional view with a diameter of 20 mm and a length of 90 mm, as shown in 3[B], were prepared and after each of their joining surfaces 2b and 4b was processed to have a mirror-surface, they were set in the electric joining apparatus 10 as described above. Then, a DC current with a voltage within the range of 5 to 10V, for example 5.4V and a current within the range of 800 to 2000 A, for example 1450 A in this Example 4, and a pulsated current with a current within the range of 500 to 1000 A, for example 800 A in this Example 4, were applied to those round bars from the power supply via the energizing electrodes for a period within the range of 10 to 25 minutes, for example 20 minutes in this Example 4, to join them temporarily. Then, the temporarily joined round bars were subjected to the mutual diffusion heat treatment in the inactive atmosphere at a temperature within the range of 1000 to 1100° C., for example 1025° C., for a period within the range of 30 to 90 minutes, for example 60 minutes in this Example 4, and thereafter were annealed completely. The unit of joined round bars, after the heat treatment had been completed, was ground so that the central portion thereof might have the average diameter of 15.05 mm, and was subjected to the tensile strength test with a gauge length of 40 mm. The result of the tensile strength test shows the resultant length of 45.8 mm, the elongation of 14.5%, and the tensile strength of 690 N/mm². These values for the tensile strength are comparatively almost equivalent to those obtained from a single piece of member of the same material and size.

According to the above electric joining method in which only the pulsated current or both of the pulsated current and the DC current are applied for performing the joining process, joining is feasible not only between the bar members of the same sectional area and the same material as described with reference to the above examples, but also between metal members of different materials, for example, between a member made of SKD61 and a member made of aluminum alloy, between a member made of SUS304 and a member made of SUS 420J2, between a member made of copper alloy and a member made of SUS420J2, and between a member made of SKH51 (high speed tool steels) and a member made of SKD61, and further between a metal member and a non-metal member or between non-metal members, without using any weld-assisting materials or brazing filler metals.

When members made of different materials, for example metal and ceramic or plastic, are joined by the present joining method, a member having gradient functionality (i.e., gradual variation in properties of the member from one side of the member to the other) is positioned between the members.

Figure 4:
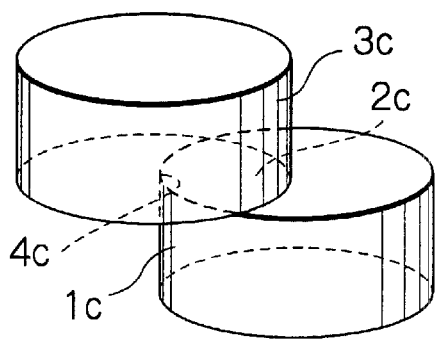
FIGS. 4(A), (B), (C) and (D) are perspective views of exemplary applications of an electric joining method according to the present invention.
Figure 4:
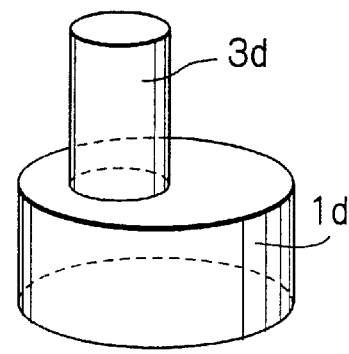
Figure 4:
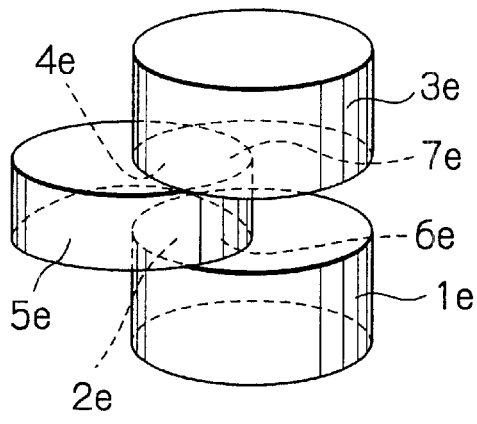
Figure 4:
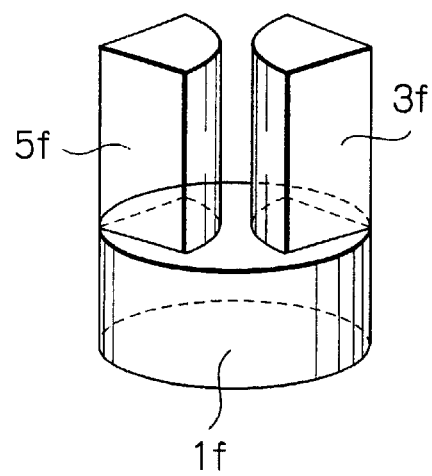

Further, the joining has been made possible between two members 1c and 3c having the same shape in plan view when they are staggered as shown in FIG. 4[A], and also between two members 1d and 3d having different shapes in plan view as shown in FIG. 4[B]. Still further, the joining has been made possible between three members 1e, 3e and 5e each having the same shape in plan view when they are staggered, that is, the joining can take place for a plurality of pairs of joining surfaces, between joining surfaces 2e and 6e and between the joining surfaces 7e and 4e, at one time, as shown in FIG. 4[C]. Yet further, as shown in FIG. 4[D], a plurality of members 3f and 5f of any arbitrary shapes (quarters of a cylindrical member 1f, in this example) is allowed to be joined onto the joining surface 2f of the member 1f. In this case, if the all the members are made of the same material, the above method allows the fabrication of parts having complicated shapes without any difficult mechanical processing. In particular, when the members 1f, 3f and 5f are joined in the above method, there is no rounding produced in the surrounding of the joining areas, but if the shapes as shown in FIG. 4[D] is created by using the mechanical processing, the rounding is inevitably produced in the processed area due to the inherent properties of the tooling. It is needless to say that the above members can be joined in the same manner when only the DC current is applied.

Figure 5:
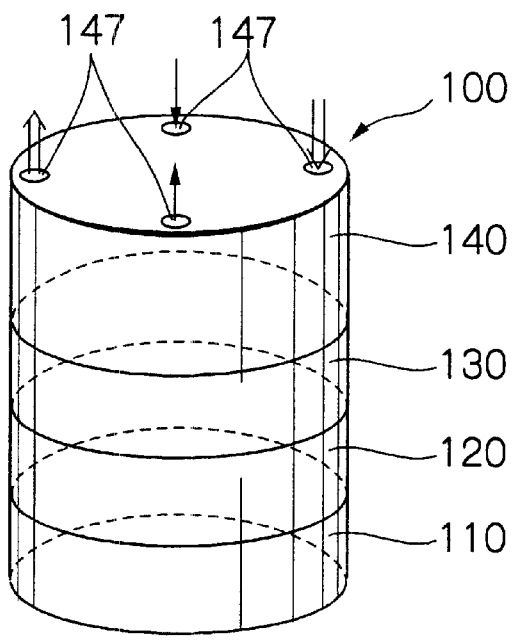
FIG. 5 is a perspective view of a plastic gear molding die formed by an electric joining method according to the present invention.
Figure 6:
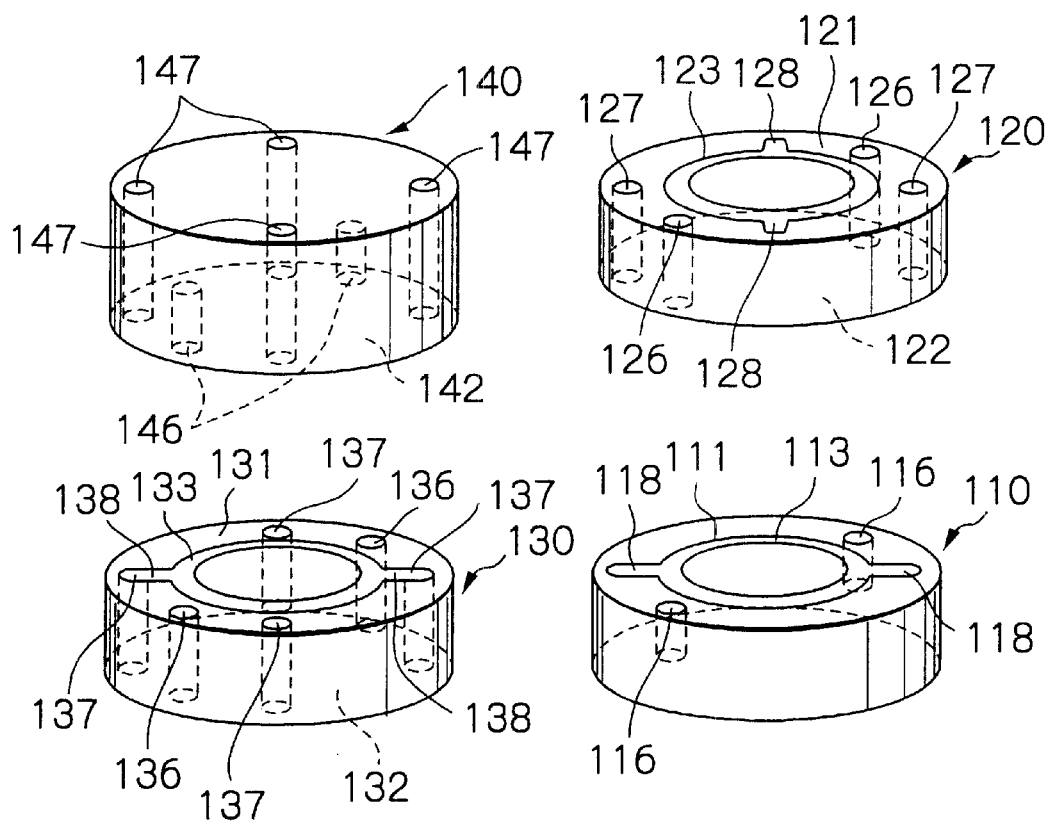
FIG. 6 is a perspective views illustrates respective members of the molding die of FIG. 5 being disassembled, showing relative positioning of grooves, through-holes and communicating channels formed in respective members.

FIGS. 5 and 6 show an embodiment for the case where one specific product, i.e. a plastic gear molding die, is fabricated according to the joining method of the present invention. In this embodiment, a plurality of members (four in this embodiment), which have been divided in advance to enable coolant passages to be formed therein for supplying coolant into the molding die, are prepared and joined after formation of the coolant passages, by the joining method according to the present invention. In this way, an integrated base material is formed for the molding die, and this base material is then mechanically processed to form a molding die.

The base material for the plastic molding die 100 comprises four members 110, 120, 130 and 140, which are made of SKD61 and cylindrical or disk-like in shape. One face 111 (the top face in FIG. 6) of the lowest member (in FIG. 5) 110 has been processed to be flat (preferably, to be a mirror-surface) and has an annular groove 113 formed therein centering around the axial center of the member. Also, the faces 121 and 131 in one side (the top faces in FIG. 6) of the intermediate members 120 and 130 have been respectively processed to be flat (preferably, to be mirror-surfaces) and have annular grooves 123 and 133 formed therein respectively centering around the axial centers of the members. Further, the lower face (in FIG. 6) 142 of the topmost member (in FIG. 5) 140 and the faces in the other side (the lower faces in FIG. 6) of the intermediate members 120 and 130 have also been processed to be flat (preferably, to be mirror-surfaces). These grooves 113, 123 and 133 have been respectively formed on a circle having the same size and a center at the central axis line of the members.

Each of the members 110, 120, 130 and 140 has a pair of locating holes 116, 126, 136 and 146 which are diametrically spaced apart from one another. These locating holes have been arranged so as to be aligned with one another, and each of the paired locating holes 126 and 136 is formed to provide a through-holes. Each of the locating holes 116 of the member 110 extends downwardly from the upper face 111 to a predetermined depth. Still further, each of the locating holes 146 of the member 140 extends upwardly from the lower face 142 to a predetermined depth. The locating pins (not shown) are to be inserted to bring the four members in position.

The upper two members (in FIG. 5) 130 and 140 have respectively four through-holes 137 or 147 equally spaced in the circumferential direction penetrating therethrough. In the upper face 131 of the member 130, communicating channels 138 have been formed extending in the radial direction from the annular groove 133 for making a communication between the annular groove 133 and the two through holes 137 among the four through holes 137, which two holes 137 have been diametrically spaced apart (in the horizontal direction in FIG. 6). The member 120 has a pair of through holes 127 which are diametrically spaced away (located in the horizontal direction in FIG. 6) penetrating therethrough. In the upper face 121 of the member 120, communicating channels 28 have been formed extending in the radial direction from the annular groove 123 for providing communication between the annular groove 123 formed in the upper face 121 and the opening ends of the remaining two through-holes 137 of the four through-holes 137 in the side of the lower face 132, which remaining two holes 137 have been diametrically spaced apart (in the vertical direction in FIG. 6). In the upper face 111 of the member 110, communicating channels 118 have been formed extending in the radial direction from the annular groove 113 for communicating with the two through holes 127 opened on the lower face 122 of the member 120 (said two holes spaced away in the horizontal direction in FIG. 6).

The members 110, 120, 130 and 140 that have been mechanically processed in advance as described above, are placed with one on the anther as shown in FIG. 5 and located in position by the locating pins (not shown) and the locating holes 116, 126, 136 and 146, and then those members are joined with one another to be integrated into one unit by the above described electric joining method in which the pulsated current or the combination of pulsated current and DC current is applied thereto, so as to form the base material 100 used for the molding die. Herein, in the base material for a molding die, the coolant passages are formed from the plurality of annular grooves 113, 123 and 133, the through-holes 127, 137 and 147, and the communicative channels 118, 128 and 138. A through-hole is formed in the central portion (in the inner side of the annular grooves in the radial direction so as not to interfere with said grove) of the base material 100 for the molding die, and a core member for forming a cavity necessary for molding of plastic (the cavity into which the plastic material is injected) is fitted within said through-hole to be formed into a molding die. It should be noted that the explanation to the processes for making up said base material for the molding die into the actual molding die is omitted, because those processes have no direct relevance to the subject invention. When said unit is used as a molding die, the coolant flows from the outside into the coolant passages in the molding die as is indicated by the arrows, to thereby cool the plastic gear molding die. The coolant flow as indicated by the arrows ⇒ passes through the annular groove 123 to cool the vicinity thereof, while the coolant flow as indicated by the arrows ⇒ passes through the annular grooves 113 and 133 to cool the vicinities thereof. It should be noted that although in the above embodiment, the annular groove and the communicative channel have been formed in only one surface of the two surfaces to be joined with each other, they may be formed in each joining surface plane-symmetrically so that these separate two parts are joined to form one passage. Further, the shape of the groove in the plan view is not limited to the circular shape shown in the above embodiment, but a wide variety of shapes may be possible.

Figure 2:
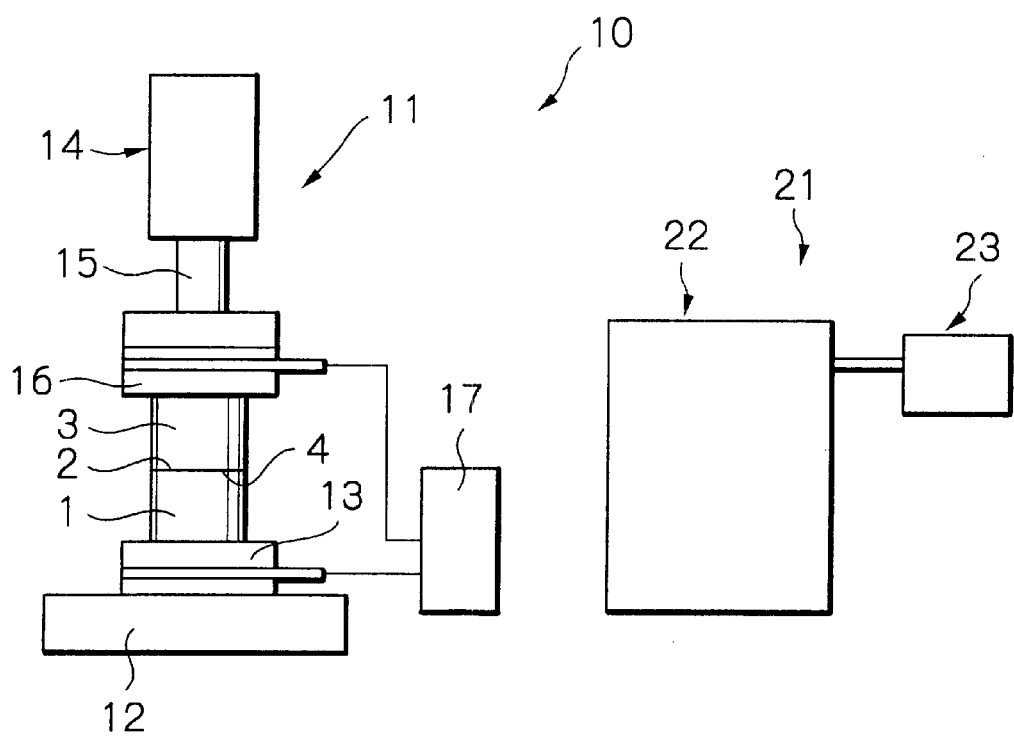
FIG. 2 is a side elevation view illustrating a conceptual configuration of an electric joining apparatus according to the present invention.
Figure 3:
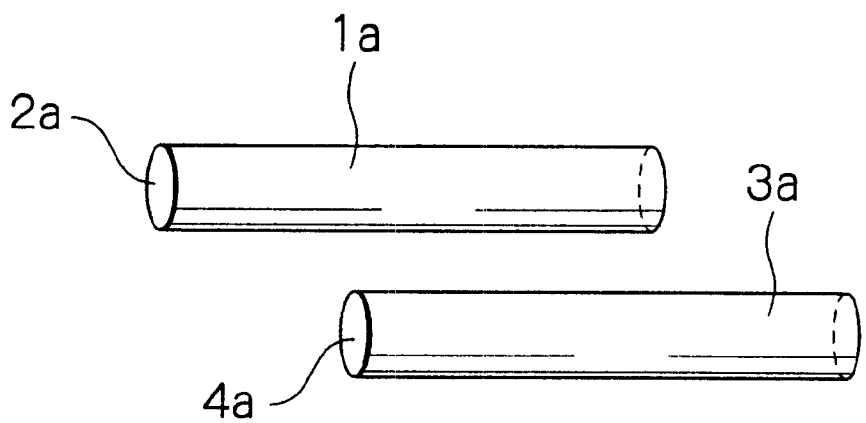
FIGS. 3(A) and (B) are perspective views illustrating round bars to be joined in the embodiments 1 and 2 respectively according to the present invention.
Figure 3:
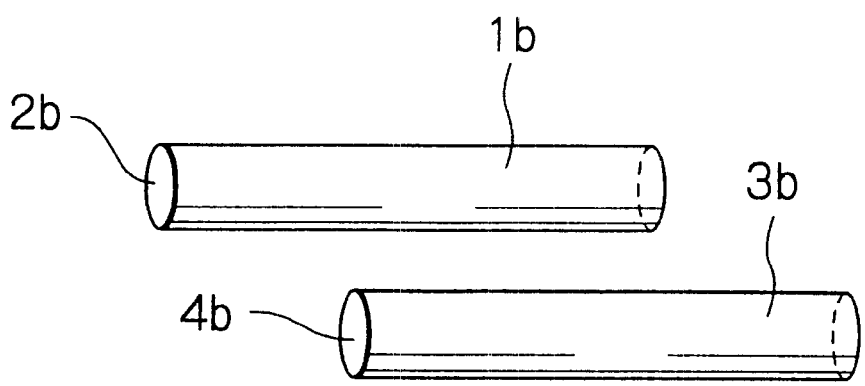
Figure 7:
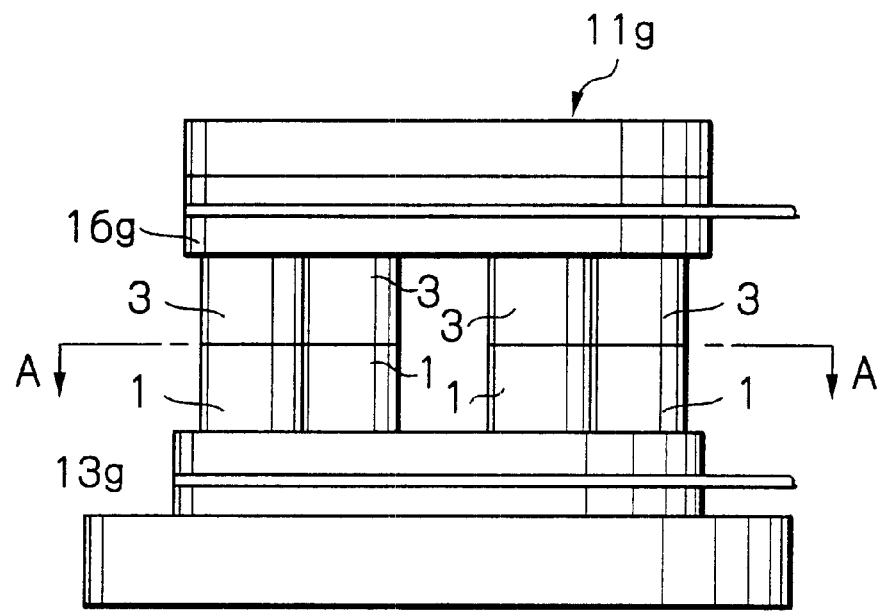
FIG. 7 is a side elevation view of an alternative electric joining apparatus according to the present invention.
Figure 8:
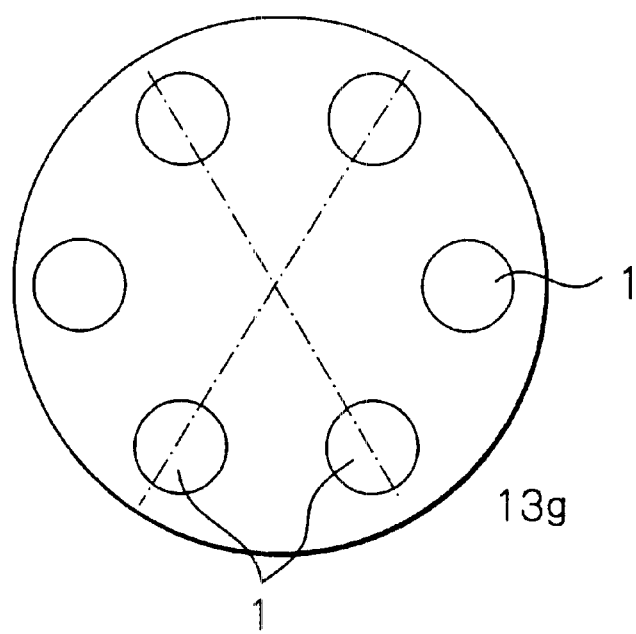
FIG. 8 is a cross-sectional view taken along line A—A of FIG. 7, illustrating an arrangement of members on a energizing electrode.

Although in the electric joining apparatus shown in FIGS. 1 and 2, the electric joining section 11 has applied at least one current selected from the pulsated current and the DC current to a plurality of members to form them into a temporarily joined unit, and then said single piece of temporarily joined unit has been heat-treated by the heat treatment section 21 so as to be made into a completely joined unit, a plurality of temporarily joined units in a group may be heat-treated in the batch processing manner. Further, in the case where the members to be joined are relatively small and are in mass production, the energizing electrodes 13g and 16g may be modified to have plate-like member (circular or polygonal member) having a larger sectional surface as shown in FIGS. 7 and 8, and a plurality of paired members 1 and 3 may be placed between those electrodes, so that the plurality of paired members can be joined at one time.

As is obvious from the above description, the present invention can be applied to various kinds of joining, including a joining of an IC substrate and a cooling metal member, a joining of an ultra-hard metal and a normal metal, a joining of a member made of aluminum or the like and a corrosion resistant or wear-resistant member, a joining of cams in multi-rows, a joining of a gear and a pinion, and a joining of a shaft and a gear.

According to the present invention, the flowing effects are expected to be obtainable.

(a) Joining is possible without using any weld assisting materials.

(b) Joining takes effect over entire joining surface and uniformly over the entire surface as well.

(c) Joining takes place by simply processing a joining surface to be flat.

(d) Joining strength can be increased by improving the flatness of a joining surface.

(e) Joining strength is improved to be made equal to that of the material of the metal member to be joined.

(f) Joining can be accomplished with only a small deformation.

(g) Such post-treatment as grinding out the weld assisting material or the brazing filler metal is not required in an area proximate to a joined portion.

(h) Joining in the precise location is possible.

(i) Joining of fine parts can be performed easily.

(j) Since a member to be joined can to be joined after it has been formed into a complete part, a product having a complicated shape can be assembled by the joining process.

(k) Joining is possible without damaging the properties of a member to be joined.

(l) Members made of different materials can be joined easily.

(m) Joining is possible with an appropriate thermal control of the portions other than the joining portions.

(n) A plurality of members of different shapes can be joined in a single operation.

What is claimed is:

1. An electric joining method comprising the steps of:
    placing joining surfaces of plurality of members to be joined such that said surface are butted against one another, without using a die made of graphite;
    applying a pulsated current or a combination of a DC current and a pulsated current to said members while applying a desired level of pressure to said members so as to join said members temporarily; and
    performing a mutual solid-phase diffusion heat treatment for said temporarily joined members under a desired temperature.

2. An electric joining method according to claim 1, in which said joining surfaces are mirror-surfaces.

3. An electric joining method according to claim 1, in which said joining surfaces are rough surfaces.

4. An electric joining method according to claim 1, in which said plurality of members substantially is made of the same material.

5. An electric joining method according to claim 1, in which said plurality of members substantially is made of a different material.

6. An electric joining method according to claim 1, further comprising the step of placing three or more pieces of said members to be joined in series, so that said pieces are joined at a plurality of pairs of joining surfaces.

7. An electric joining method according to claim 4, further comprising the step of placing three or more pieces of said members to be joined in series, so that said pieces are joined at a plurality of pairs of joining surfaces.

8. An electric joining method according to claim 5, further comprising the step of placing three or more pieces of said members to be joined in series, so that said pieces are joined at a plurality of pairs of joining surfaces.

9. An electric joining method according to claim 1, in which said pressure applied to said members is controlled to be equal to or less than 50 Mega-pascal.

10. An electric joining method according to claim 1, in which said heat treatment is performed in an inactive atmosphere.

11. An electric joining method according to claim 1, in which said heat treatment is performed within a temperature range controlled to be equal to or lower than a temperature of 85% of the lowest melting point of the members to be joined.

12. An electric joining method according to claim 4, in which said heat treatment is performed within a temperature range controlled to be equal to or lower than a temperature of 85% of the lowest melting point of the members to be joined.

13. An electric joining method according to claim 5, in which said heat treatment is performed within a temperature range controlled to be equal to or lower than a temperature of 85% of the lowest melting point of the members to be joined.

14. An electric joining apparatus for joining a plurality of members to be joined at joining surfaces thereof, said apparatus comprising:
    an electric joining device including a pair of current-carrying electrodes capable of contacting with said members so as to apply electricity thereto, a power supply connected to said pair of energizing electrodes for supplying said energizing electrodes with a pulsated current or a combination of a DC current and a pulsated current, and a pressurizing unit for compressing each of said pair of electrodes against said joining surfaces, wherein said pair of members are sandwiched between said energizing electrodes and applied with at least either one of the DC current or the pulsated current from said power supply under a desired pressure, thus to be joined without using a die made of graphite; and
    a heat treatment equipment for performing a mutual solid-phase diffusion heat treatment for the temporarily joined members under a desired atmosphere.

15. An electric joining apparatus according to claim 14, further comprising an inactive gas supplying source coupled to said heat treatment equipment for supplying inactive gas into said heat treatment equipment.

* * * * *